BEST AVAILABLE COPY

R. H. LONG.

Dummy Engine.

No. 1,254. Reissued Jan. 7. 1862.

Witnesses:

H. V. Coombs

G. W. Reed

Inventor:

R. H. Long by Munn & Co. Attys

AM. PHOTO-LITHO. CO. N.Y. (OSBORNE'S PROCESS.)

UNITED STATES PATENT OFFICE.

ROBERT H. LONG, OF PHILADELPHIA, PENNSYLVANIA.

IMPROVED ARRANGEMENT OF STEAM-ENGINES FOR PROPELLING STREET PASSENGER-CARS.

Specification forming part of Letters Patent No. 26,911, dated January 24, 1860; Reissue No. 1,125, dated January 15, 1861; Reissue No. 1,254, dated January 7, 1862.

DIVISION B.

*To all whom it may concern:*

Be it known that I, ROBERT H. LONG, of the city nd county of Philadelphia, and State of ylvania, have invented a new and provement in the mode of propelling way-cars by steam, which is also applica- to the propulsion of carriages by steam mmon roads a d to the propulsion of r carriages by locomotives; and I do declare that the following is a full, and exact description of the same, reference being had to the accompanying drawings, forming part of this specification, in which—

Figure 1:
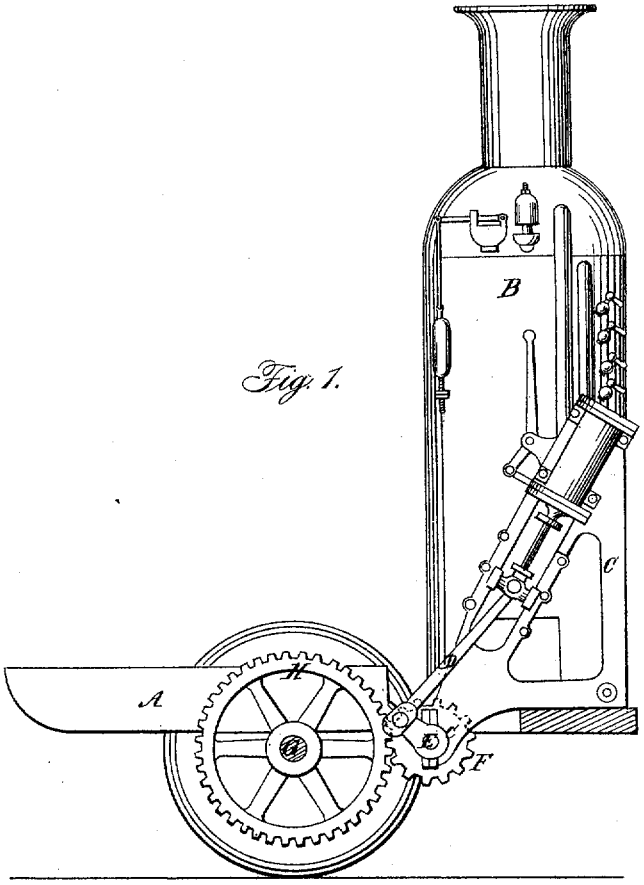
Figure 2:
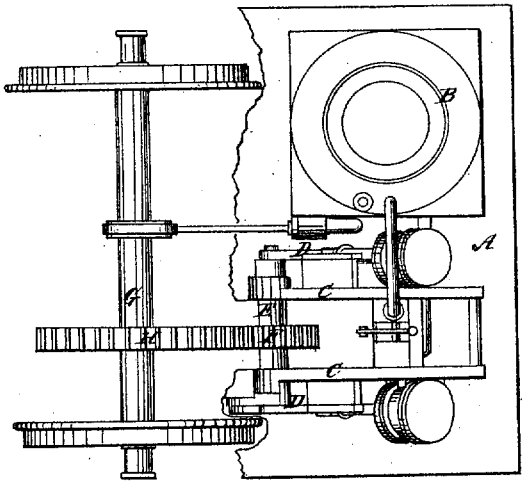

Figure 1 is a side view, partly in section, of the front portion of a railway car having my improvement applied. Fig. 2 is a plan o the same.

Similar letters of reference indicate corresponding parts in the two figures.

This invention relates to the transmission of the power of the engine to the driving-axle of a railway car, carriage, or locomotive by means of gearing; and it consists in the attachment of the driving-pinion to the framing of the engine in such a position, as hereinafter described, is that its axis is in, or nearly in, the same plane with the driving-axle of the car, carriage, or locomotive, whereby, whenever the engine is jolted, it causes a slight movement of the driving-pinion around the cog-wheel, which derives motion from it without disturbing the gearing, and obviates any injurious effects upon the engine.

A is the platform or main frame of the car, arriage, or locomotive. B is the boiler. C D E is the engine, having its frame C erected upon the platform A and having its crank-shaft E arranged with its axis parallel with and in, or nearly in, the same horizontal plane with the axis of the driving-axle G. The crank-shaft E has the driving-pinion F fast upon it and so attaches the said pinion to the frame C of the engine and to the connecting-rod D, and the driving-axle G has fast upon it the cog-wheel H, with which the pinion gears.

The cog-wheel H is of greater size than the pinion F, the object of which is to obtain by a smaller engine running at a high velocity as much power as can be obtained by a larger engine whose crank makes but one revolution for every one of the driving-axle, and thereby to save much weight, which is of especially great advantage in the propulsion of a car or carriage by an engine which it itself carries. Such a system of gearing whould be liable to serious objections were it not for the arrangement of the crank-shaft E with its axis in, or nearly in, the same horizontal plane with the axis of the driving-axle G.

What I claim as my invention, and desire to secure by Letters Patent, is—

Transmitting the power of the engine to the driving-axle by means of a driving-pinion, F, attached to the frame of the engine, and arranged relatively to the driving-axle, to operate substantially as herein specified.

ROBT. H. LONG.

Witnesses:

J. M. FOLTZ,

GEORGE BUTLER.